May 23, 1933.   A. G. RAYBURN   1,910,054
POWER TRANSMISSION
Filed Aug. 30, 1926   5 Sheets-Sheet 1

Inventor
Alden G. Rayburn
William A. Strauch
By
Attorney

May 23, 1933. A. G. RAYBURN 1,910,054
POWER TRANSMISSION
Filed Aug. 30, 1926 5 Sheets-Sheet 5

Patented May 23, 1933

1,910,054

UNITED STATES PATENT OFFICE

ALDEN G. RAYBURN, OF SAUSALITO, CALIFORNIA, ASSIGNOR, BY MESNE ASSIGNMENTS, TO AUTOMOTIVE ENGINEERING CORPORATION, A CORPORATION OF DELAWARE

POWER TRANSMISSION

Application filed August 30, 1926. Serial No. 132,585.

The present invention relates to power transmissions, and more particularly to torque multiplying and speed varying fluid operated power transmissions of the type in which the operating fluid comes to rest when the driving and driven members are rotating at the same speed.

A primary object of the invention is to provide simplified hydraulic transmissions of the type mentioned in which the resistance to the flow of fluid is reduced to a minimum and which are adaptable for the transmission of large powers and for relatively high speed operation.

Another object of the invention is to provide novel cooling and control methods and mechanisms for hydraulic transmissions especially adapted for use in locomotives, rail cars, and road vehicles.

Further objects of the invention are such as may be attained by a utilization of the various combinations, sub-combinations and principles hereinafter set forth in the various independent relations to which they may be obviously adapted without departing from the spirit of the invention as pointed out, particularly in the following detailed disclosure and in the terms of the appended claims.

Referring to Figures 1 to 6, a stationary casing 1 is utilized and is provided with end castings 2 and 3 removably secured thereto and with suitable supporting legs (not shown) by means of which the casing is held stationary. Casting 2 has formed integrally therewith a fluid storage reservoir 4 provided at its bottom with a drain plug 5 and at its top with a filling plug 6. Formed in the plug 6 is a passage 7 connecting the interior of the reservoir 4 to atmosphere, and formed in the wall between the reservoir 4 and the interior of the main casing is an opening 8 through which air may pass into the top of the storage reservoir 4 and out to atmosphere through the passage 7. Secured to and projecting through the forward end wall of the reservoir 4 is a cap member 9 in a bore of which anti-friction or ball bearing 10 is slidably supported. The inner race of bearing 10 is rigidly secured to and supports drive shaft coupling member 11 which extends outward through a suitable packing gland structure 12 formed in the cap 9. Coupling member 11 is splined and rigidly secured to the end of driving shaft section 13 by means of the securing nut 14. Engaging the bearing, and end of coupling member 11, are the lower ends of a pair of actuating arms 14' disposed at opposite sides of the shaft 13. The upper ends of the arms 14' are supported on and keyed to an actuating shaft 15 which is suitably journaled and packed against leakage and extends through the side walls of reservoir 4. Shaft 15 may be actuated by any suitable mechanism, such for example as by a suitable linkage connected to the clutch pedal of a motor vehicle. When shaft 15 is actuated to move arms 14' clockwise in Figure 1, bearing 10, together with coupling member 11 and shaft 13 will be shifted to the left in Figure 1 to declutch the mechanism as will more fully hereinafter appear.

Formed integrally with shaft 13 is a helically grooved section 16 rotatably and slidably supported in tubular pump control member 17. Secured to the forward end of member 17 is an actuating collar 18 provided with a peripheral groove in which the actuating ring 19 is nested. Actuating ring 19 is provided with diametrically opposite trunnions 20 which fit slidably into actuating slots formed in the bifurcated ends 21 of the shift lever 22. Shift lever 22 is provided with a ball 23 secured in a ball seat 24 formed in the top of the storage reservoir 4. Member 17 is slidably keyed in a suitable bore formed in the forward end of pump casing section 25 which in turn is journaled in the anti-friction bearing 26 supported in a suitable seat formed in the rear end wall of the reservoir 4 and is rigidly secured to rotatable valve member 27 by means of through bolts 28 or in any other suitable manner. Formed integrally with the rear end of drive shaft section 16 is a pair of spaced parallel yoke members 29 in which are formed the rectangular trunnion block supporting recesses 30. Slidably supported in the recesses 30 are trunnion blocks 31 in which the ends of the universal joint trunnion pin 32 are journaled. Rotatably supported on the trunnion pin 32 between the yoke 29 is the universal joint trunnion member 33 provided with the trunnions 34, the axis of which is in the plane of and at right angles to the axis of trunnion pin 32. Trunnions 34 are journaled in bearing blocks 35 which in turn are secured in pump ring or backing disc 36. Supported in ring 36 are ball seats 37 for the outer ball ends of the pump piston rods 38. The inner ball ends of the piston rods 38 are seated in ball seats 39 of the pump pistons 40. The pump pistons 40 are mounted for reciprocation in the cylinders 41 of the cylinder block 42. Cylinders 41 are spaced around the block 42 and an odd number of cylinders, preferably nine or more are provided. Communicating with the interior of each cylinder 41 is a fluid port 43 leading from the valve face 44 of the cylinder block 42 to the interior of the pump cylinders. Cylinder block 42 is provided with a central bore 45 provided with diametrically opposite key ways in which the ends of the securing key members 46 are seated. Key members 46 are rigidly secured in driving shaft section 47 which is formed integrally with the ends of yokes 29. Positioned between the yoke 29 and guided by the driving shaft section 47 is a sliding coupling member 48. Interposed between coupling member 48 and cylinder block 42 is helical spring 50 which yieldingly holds the valve face 44 of cylinder blocks 42 against the forward face of valve member 27. Threaded on the rear end of the shaft section 47 is a securing collar member 51 which, as the shaft sections 13 and 47 are moved endwise by actuation of the arm 14′, engages and shifts the cylinder block 42 to disengage the valve face 44 of the cylinder block from the pump timing face of valve 27. This movement of the cylinder block 42 compresses spring 50 and when the arms 14′ are moved counter-clockwise in Figure 1, the spring 50 restores the cylinder block 42 together with the driving shaft and connected parts to the position shown in Figure 1. The movement of shaft section 13 and the connected parts to the left is limited by engagement of rear edges of recesses 30 with the rear edges of the blocks 31.

Ring or backing disc 36 of the pump is rigidly secured to and rotatable with race 53 of a conical roller bearing 54 and radial ball bearing 55. Bearings 54 and 55 are secured in the pump angle or tilting box 56 which in turn is rotatably supported on a pair of diametrically opposite trunnions 57, (see Figure 5) which are in axial alignment with the universal trunnion pin 32. Trunnions 57 are supported in bearing blocks 58 which in turn are supported in suitable recesses of the rotatable pump casing 25. Formed integrally with the pump angle or tilting box (Figure 1) is an actuating extension 58′ which seats in a recess of the actuating rod 59. Actuating rod 59 is guided in a suitable channel formed in rotatable pump casing 25 and the forward end thereof is provided with a ball member 60 seated in a suitably recessed extension 61 of the sliding sleeve 17. The rear end of the actuating rod 59 is slidably supported in and extends through a suitable opening or passage formed in the valve plate 27 and is provided with V-shaped locking notches 62 with which the V-shaped end of locking plunger 63 is adapted to register. The locking plunger 63 is seated in bore 64 of valve 27 and is yieldingly forced outward by a helical spring 65. In operation of the device, fluid under pressure is admitted to the recess 64 through a conduit 66 from the passage 67 (Figures 1 and 2) formed in the valve member 27. In operation, fluid pressures back of the locking plunger 63 force the V-shaped end thereof into engagement with a notch of the actuating member 59 holding the pump angle or tilting box 56 in a predetermined or fixed position of angularity that determines the maximum fluid pressure that the pump can develop with the particular angularity. To change the angularity of the pump tilting or angle box, the pressure in the system is released by shifting the driving shaft section 13 endwise to unseat the pump cylinder block 42 from engagement with the valve 27, releasing the fluid pressure back of the plunger 63. The lever 22 may then be actuated to shift sleeve 17 and the actuating rod 59 endwise until the spring 65 seats the V-shaped end of plunger 63 in the desired one of the notches 62. By varying the angularity of the pump tilting box between a vertical position and the position shown, the pressures developed by the pump may be increased and the speed of pumping fluid decreased. The position of maximum angularity may be arranged so that the mechanism will meet all normal conditions of operation, and the angularity may be reduced when it is desired to meet abnormal conditions of torque multiplication, or speed reduction. In vertical position of the tilting box, no pumping action occurs and the transmission is in neutral position. By tilting the box 56 to a position of angularity opposite to that shown in Figure 1, the high and low pressure sides of the pump unit are reversed. The details of piston construction, cylinder block construction and the pump so far disclosed are similar to those disclosed in my copending application Serial No. 123,701, filed July 20, 1926 to which reference may be had for details of construction not herein described.

Figure 1:
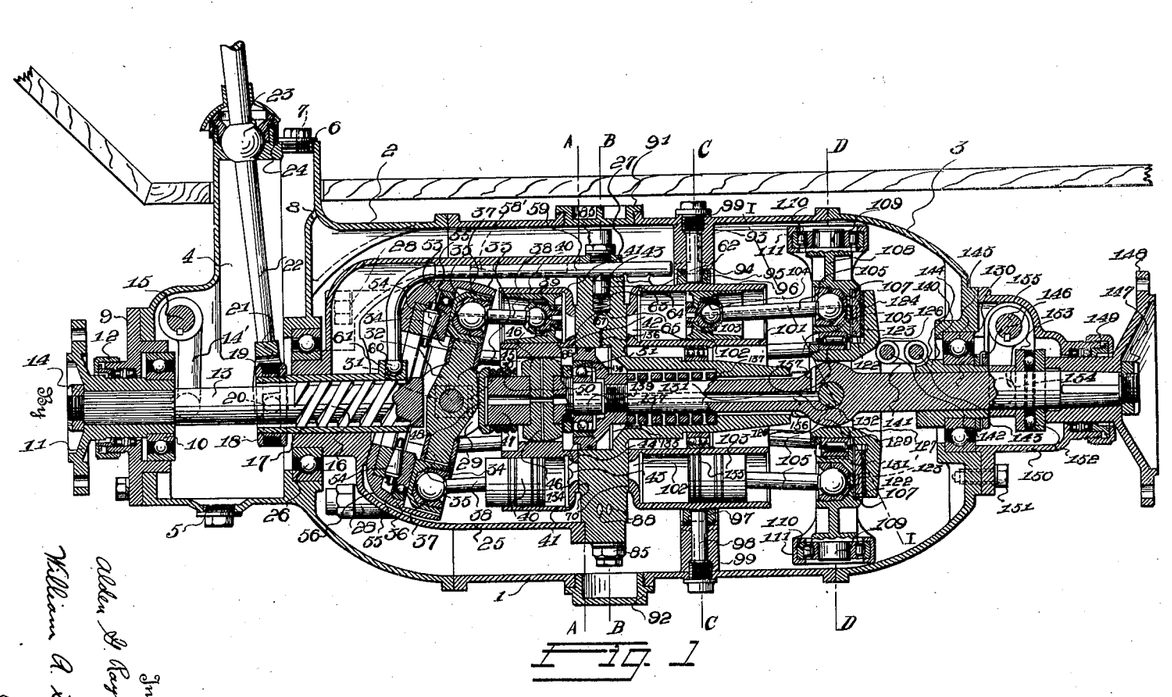
Figure 1 is a sectional elevation showing one form of the invention.

Formed in the valve member 27 are the fluid ports 68 and 69 which extend between the pump and motor timing faces 70. At one end ports 68 and 69 communicate with the passage-way 67. The ends of passage-way 67 are closed by screw plugs 71 and slidably supported in the passage is a valve 72. Valve 72 is provided with the guiding and stop extensions 73 which abut against the plugs 71 and limit the sliding movement of valve 72. Formed in the valve 27 and communicating with the passage 67 are the outlets 74 which terminate in seats for the conical ends of valves 75. Valves 75 are screwed into suitable threaded recesses in the valve plate 27, and are drilled centrally with outlet openings through which air or liquid may pass when the conical ends thereof are unseated from the ends of conduits 74 and suitable closing caps 76 are threaded in position on the ends of the needle valves. A pair of diametrically opposite relief valves 77 secured in position by the caps 78 are provided in suitable recesses in the valve 27. The valves 77 control relief passages 79 that communicate with ports 68 and 69 and the fluid outlet ports 80 located on the pump side of the valve 27 outside of the pump timing face 70. When the pressure in the ports 68 and 69 exceeds the predetermined pressure for which the valves 77 are set, the valves 77 unseat establishing communication between passages 79 and 80 and relieve the excess pressure in the circulating system.

Communicating with ports 68 and 69 opposite the passage 67 are fluid intake and outlet passages 82 which are controlled by valves 83. Each valve 83 comprises a sleeve 84 threaded into passages 82 and the outer ends of sleeves 84 are closed by the plugs 85. Each valve is provided with a head 86 adapted to seat against the ends of the sleeves 84 and heads 86 are connected to and actuated by pistons 87 slidably supported in the sleeves 84. Space is provided between the outer ends of pistons 87 and plugs 85 when valve heads 86 are seated so that fluid under pressure can pass from ports 68 and 69 through conduits 88 and suitable openings formed in the end of the sleeves 84 back of the pistons forcing the pistons inward to unseat the heads 86. The inward movement of valves 86 is limited by stop members 89. Fluid ports 90 are provided extending from the pump side of the valve plate 27 outside of the pump timing face 70 into the interior of the valve sleeves 84 so that when a valve head 86 is unseated the corresponding ports 68 or 69 and 90 are in communication. In operation of the device, valve plate 27 rotates with the tail shaft as will more fully hereinafter appear and centrifugal force tends to close the valves 83. When port 68 is connected to the high pressure side of the pump and port 69 is connected to the low pressure side of the pump, the fluid pressure in the port 68 will seat the valve 83 in communication therewith, while fluid under pressure will pass from the port 68 through conduit 88 to the piston 87 of the valve 83 individual to the port 69, and will unseat this valve, establishing a direct connection between the port 69 with the interior of the rotating pump casing 25 outside of the pump timing face 70. In like manner if port 69 is connected to the high pressure side of the pump and port 68 is connected to the low pressure side of the pump, the port 68 will be in communication with the interior of the casing section 25. It will accordingly be seen that the internal fluid circulating system of the transmission is open at all times to the interior of rotating casing section 25 which rotates in operation as will more fully hereinafter appear so that a constant tendency exists for the fluid in the internal circulating system to change continuously. It will also be noted that as the fluid passages 90 are disposed adjacent the periphery of the rotating casing 25, and that as oil in the casing section 25 will be forced outward by the centrifugal action building up pressure in the oil adjacent the casing due to centrifugal force, the suction side of the pump in operation is accordingly always under a positive pressure tending to feed oil into openings 90. Due to this positive pressure, and since the passages 90 are but slightly spaced outwardly from the path of circulation of the working fluid, the reserve fluid may flow from casing 25 into the openings 90 to the working fluid to compensate for any leakage of the latter and to displace any air entrained therein. This entrained air may exit outwardly through the passages 90 and, being lighter than the oil will collect in the central part of the casing section 25 and then pass out of the mechanism as will more fully hereinafter appear. Provided in the casing 1 adjacent the valve plate 27 are the diametrically opposite screw plugs 91 and 92 which provide convenient access to the valve plate in operation of the device, and plug 92 provides a convenient means for draining the casing section 1 of fluid when desired.

Formed integrally with the casing 1 is a motor supporting section 93 (Figures 1 and 3) in which a central bore 94 is formed. Seated in the central bore 94 is the supporting extension 95 of motor cylinder block 96. The periphery of the supporting extension 95 is spherical in shape and formed in extension 95 are diametrically opposite keyways provided with a curved bottom as shown in Figure 1. Key members 97 fit into the keyways and are pivotally supported on the inner ends of trunnion pins 98. Trunnion pins 98 are provided with the threaded ends 99 threaded into suitable recesses formed in casing section 1. In this way it will be seen that cylinder block 96 is supported on its extension or ring 95 in the bore 94 and is prevented from rotation and endwise movement by keys 97, but is permitted a limited universal movement so that the valve face of the cylinder block may seat itself against the motor timing face 70 of the valve member 27. Formed through the supporting rib section of casing section 93 are the openings 100 to permit flow of fluid between the sections of the casing 1 when the motor cylinder block 96 is in position.

Formed in the cylinder block 96 are a plurality of spaced motor cylinders 101, an odd number of cylinders preferably nine or more in number being utilized. Connecting each cylinder with the timing face of the cylinder block are the ports 102 through which fluid passes into and out of the cylinders in operation of the device. Mounted for reciprocation in each of the cylinders 101 is a piston 103 and seated in ball seats 104 of the pistons 103 are ball ends of the piston rods 105, the opposite ball ends of which are seated in ball seats 107 of the motor angle plate 108. The motor angle plate 108 has formed integrally therewith the diametrically opposite trunnion members 109 (Figures 1 and 4) which are rotatably supported in roller or anti-friction bearings 110. Roller bearings 110 in turn are rigidly secured in supporting member 111 which in turn has formed integrally therewith the axially aligned trunnions 112. The axis of trunnions 112 is in the plane of and at right angles to the axis of trunnions 109 and trunnions 112 are supported in the roller or anti-friction bearings 113 which in turn are supported in bearing members 114. Bearing members 114 are mounted for reciprocation in recesses 115 formed in the casing section 1 and the end casting 3, and are provided with the cylindrical supporting extensions 116 which are slidably supported in the bores 117 formed in the end casting 3. The forward ends of the bearing supporting members 114 are provided with the cylindrical extensions 118 which are slidably supported in cylindrical bores 119 formed in the casing section 1. The extensions 118 are bored internally and in these bores the helical springs 120 with the forward ends thereof resting against the bottom of the cylindrical bores 119 are disposed. Springs 120 normally urge the bearing members 114 together with the universal member 111 and the motor angle plate 108 to the right in Figure 1.

Figures 4, 5, 6:
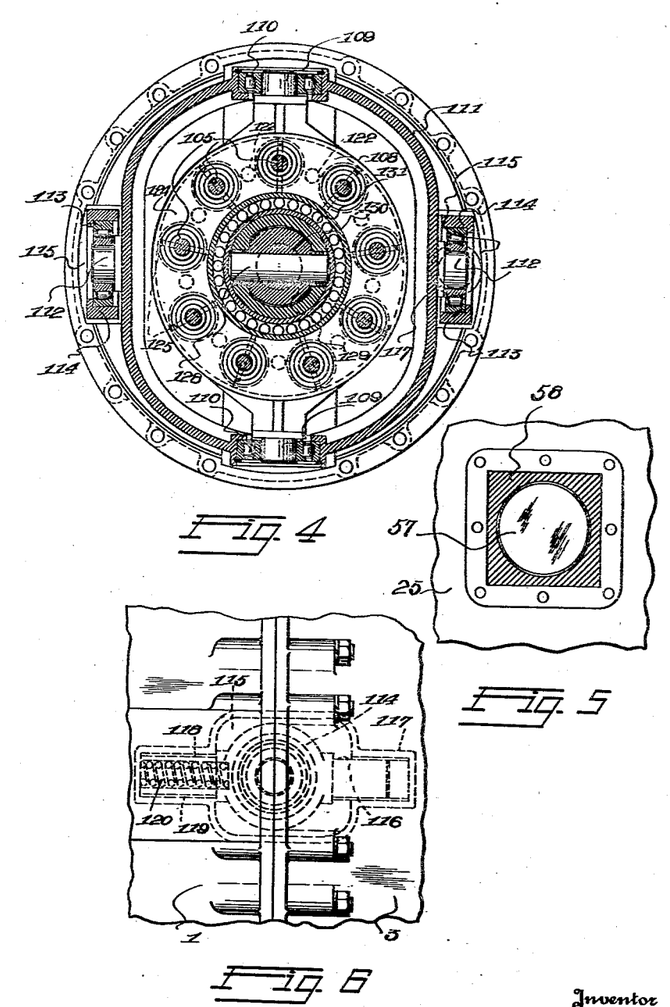
Figure 4 is a transverse sectional view taken in plane D—D of Figure 1.
Figure 5 is a fragmental view showing the manner of supporting the pump backing plate or angle box in the rotary casing.
Figure 6 is a fragmental detailed view showing a method of supporting the trunnions of the universal supporting member for the motor backing plate.
Figure 7:
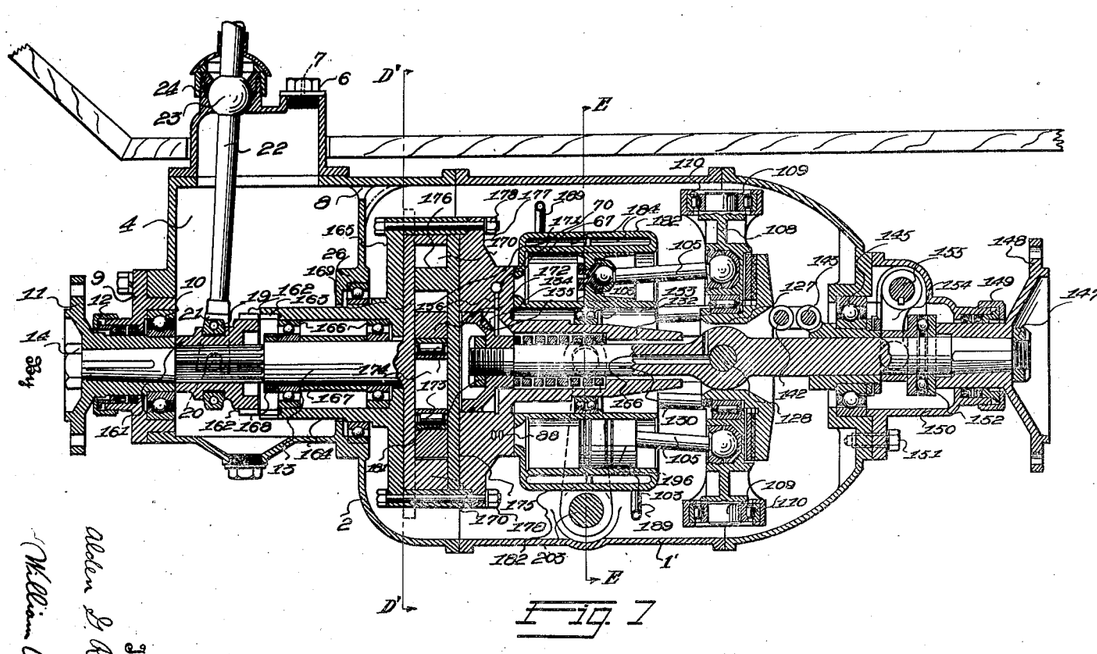
Figure 7 is a vertical section view through a modified form of the invention.

The method of suspension of plate 108 permits a universal movement thereof about trunnions 109 and 112. Secured in the rear face of the motor angle plate 108 are hardened metallic plugs 122 (Figures 1 and 4) which bear against hardened metallic plugs 123 in turn rigidly mounted in a set of bearing shoes 124. These shoes are shaped like segments of an annular ring. The bearing faces of shoes 124 are preferably lined with a bearing metal such as Babbitt. Shoes 124 are loosely seated in recesses formed in the back of the motor angle plate 108 and are spaced apart and prevented from rotating with relation to the angle plate 108 by the projecting spacing lugs 125 (Figure 4). In the form of invention shown the shoes 124 are equal in number to the motor pistons and the ends of adjacent shoes are disposed in substantial alignment with the ends of the motor piston rods 105. Shoes 124 being loosely supported in the recesses in angle plate 108 in operation, the bearing faces thereof will align with the bearing face of a central drive member 126 which is rotatable relative to the shoes and the plate 108. Drive member 126 is provided with a tubular extension 127 journaled on the ends of a driving pin 128 in turn secured to and supported in an enlarged section 129 of the driven shaft or tail shaft 130. Supported on the extension 127 of the drive member 126 is a radial roller or anti-friction bearing 131 secured in position by a collar 131' and on which the angle plate 108 is supported. Slidably splined to the tail shaft 130 is a tubular extension 132 formed integrally with the valve plate 127 and supported on the extension 132 is the inner race of a self-aligning bearing 133. The outer race of bearing 133 is secured to and supports the motor cylinder block 96 and the center of aligning movement of this bearing coincides with the center of universal movement of block 96 so that the universal seating movement of block 96 is unrestricted. Threaded to the forward end of the tail shaft section 130 is a piston 134 which is slidably supported in a cylindrical bore 135 formed in the valve plate 27. A conduit 136 connects the passage 67 of valve plate 27 to the bore 135 independently of the position of valve 72 in the passage so that in operation of the device the high pressure fluid is admitted through conduit 136 to the bore 135 back of piston 134 tending to shift the piston 134 together with the tail shaft section 130 and the parts carried by the tail shaft to the left in Figure 1. Helical spring 137 interposed between a packing member 137' seated against a shoulder formed on extension 132 of the valve 27 and the piston 134 normally forces the tail shaft 130 to the left in Figure 1. Centrally supported in the piston 134 is an anti-friction self aligning bearing 138 in which the end section 139 of driving shaft 13-47 is slidably supported for rotation.

The central motor drive member 126 is designed to have one end of a link 141 pivotally connected thereto by means of a securing pin 142. The opposite end of the link 141 is pivotally connected by means of pin 143 to an apertured lug formation 140 on a sleeve 144 which in turn is supported for rotation in anti-friction bearing 145 rigidly supported in the casing end section 3. A collar 146 secured to sleeve 144 prevents end-wise motion of sleeve 144. Tail shaft section 130 is slidably journaled in and extends through sleeve 144 and has secured to the outer end thereof by means of securing nut 147 a coupling member 148. Coupling member 148 is rotatable within a sealing or stuffing box 149 carried at the rear end of a capping casing 150, the latter being secured to the casting 3 by bolts 151. Interposed between the member 148 and the sleeve 144 there is an anti-friction thrust bearing member 152 provided with a tubular race member 153 engaged by the lower end of actuating arms 154 disposed on opposite sides of shaft section 130. The upper ends of the arm 154 are keyed to a shaft 155, one end of which extends through the casing 150 and is connected to a suitable actuating mechanism for rotating the shaft 155, to shift arms 154 counter-clockwise and shaft section 130 to the right in Figure 1.

Formed centrally through sections 47 and 139 of the driving shaft and through the forward end of tail shaft 130 is a passage 156 with which a passage 157 formed in tail shaft section 129 communicates.

Figure 2:
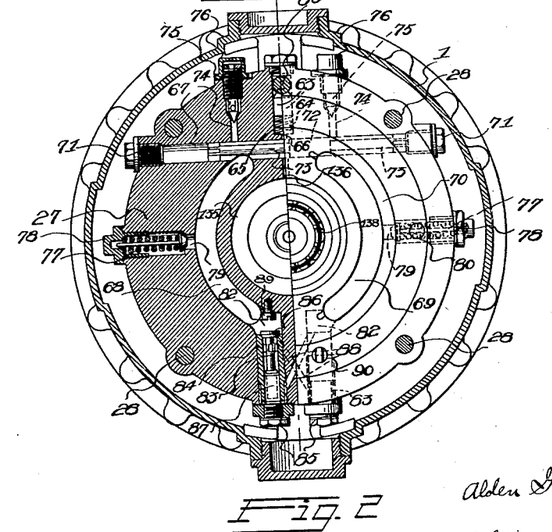
Figure 2 is a transverse sectional view taken in the planes A—A and B—B of Figure 1.
Figure 3:
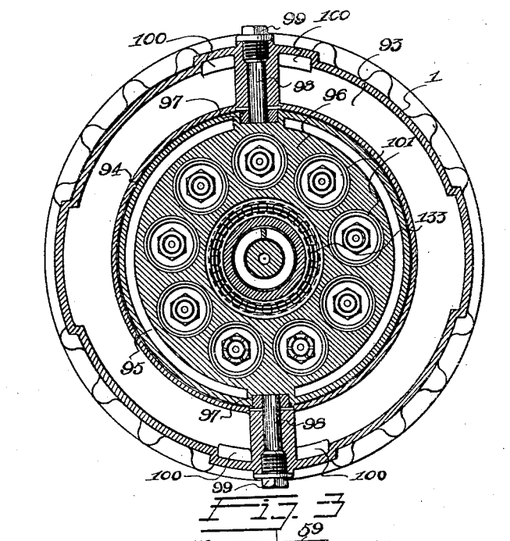
Figure 3 is a transverse sectional view taken in plane C—C of Figure 1.

It will be noted (Figures 1, 2 and 4) that the axis of the trunnion pin 128 of the central motor drive member 126 is fixed in the central plane of the timing ports 68 and 69 in the motor timing valve face 70 and that the valve plate 27 is rotatable with the motor shaft 130. In normal operation fluid under high pressure is delivered to port 68, port 69 is the low pressure port, and fluid under pressure passes through the conduit 136 to bore 135 back of piston 134. Spring 137 together with the fluid pressure on piston 135 act on shaft 130 to oppose the pressure of the motor pistons 103 tending to urge motor backing plate 108, drive member 126 and shaft 130 together with the connected parts to the right in Figure 1. The area of the motor pistons in communication with port 68 is made greater than the effective area of the piston 134 and by such an amount, and the parts are so proportioned that as the pressure of the fluid reaches a predetermined value, the pressure exerted by the motor pistons will be sufficient to overcome the resistance of spring 137 and the pressure on piston 135. As the fluid pressure rises above this predetermined value, fluid will be slowly forced out by the piston 134 through passage 136 into the passage 67 and high pressure port 68 and shaft 130 will slowly move to the right in Figure 1 an amount depending on the excess of fluid pressure over the predetermined value. As the shaft 130 and connected parts move to the right, the pin 142 of the central drive member 126 together with universal ring member 111 and the parts connected thereto will tilt about the aligned axis of trunnions 112 and 128 toward the position indicated by the center line I—I in Figure 1. As the parts tilt, resultant thrusts tending to rotate the drive member 126 in Figures 1, 3 and 4 are developed. The magnitude of the forces tending to rotate member 126 increases with the increase of angularity of the parts and when these forces are sufficient, shaft 130 together with valve plate 27 will be rotated and successive ports of cylinders 101 are connected to ports 68 and 69 so that a continuous thrust tending to rotate shaft 130 is maintained while an oscillating motion is imparted to the motor backing plate 108 about trunnions 109 and 112. Tilting movement of the plate 108 and related parts will continue until the resistance of spring 137 counter-balances the pressure exerted by the motor pistons tending to move shaft 130. The spring 137 will shift the shaft 130 and vary the inclination of parts to maintain this balance so long as the fluid pressures exceed the predetermined value and when the pressure drops to the predetermined value the parts will be restored to the position shown in Figure 1. The angularity of the motor angle plate and driving connection 126 is accordingly automatically varied in this form of the invention in accordance with the fluid pressures developed after a predetermined pressure is exceeded. As the torque deliverable by the motor increases from zero to a maximum value the relative speed of rotation of the shaft 130 decreases from a maximum to a minimum value. It will be noted that the motor backing plate 108 and the motor cylinders are supported in casing 1 in a manner permitting universal movement, but rotation thereof is prevented. Motor backing plate 108 is supported in such a manner that no rotary driving reactions are transmitted to pistons 103 or to the cylinder block 96. All of the forces tending to rotate the tail shaft 130 react against the supporting structure for the motor backing plate 108.

It frequently is desirable in power transmissions, to establish a fixed ratio of speed reduction or torque muliplication, independently of the pressures developed in the system, as for example when it is desired to use engine compression in a motor vehicle for braking purposes, or when it is desired to proceed at a very low rate of speed for driving in traffic. This may be accomplished by actuating shaft 155 counter-clockwise in Figure 1 causing the arms 154 to force the shaft 130 to the right a distance that will tilt the parts to give the desired angularity and speed and torque ratios. While the spring 137 has been shown to effect restoration of the parts to the position shown in Figure 1 as the fluid pressure decreases, it will be understood that other means for accomplishing this result may be utilized.

While the motor as disclosed is hydraulically operated, it will be obvious that the construction for converting the reciprocating motion of the pistons and the means for varying the angularity of the central drive member and motor backing plate may be applied to any type of engine or motor. For example, by fixing the mechanism so that below a predetermined pressure applied to the pistons, drive member 126 will come to a minimum angle, and as the pressures in the pistons exceed the predetermined value, the angularity of parts will increase. As the resistance on the motor or engine shaft increases, the effective pressures on the pistons rise, and the stroke of the pistons will automatically increase, increasing the torque and power delivered, and as the resistance decreases, the piston stroke and power delivered will be reduced.

The operation of the various independent units having been described in detail, a general description of the operation of the mechanism will now be given. The mechanism is initially filled with fluid in any convenient manner. For example, plug 91 may be removed and valve plate 27 may be turned until the valves 83 are positioned beneath plug opening. Sleeves 84 may be removed and the oil or fluid poured through openings 82 filling the internal circulating system and the pump casing 25 as much as possible. Valves 83 may then be replaced and fluid may be filled into casing 1 through the opening for plug 91 and into the reservoir 4, through filling plug 6. When casing 1 is filled plug 91 may be replaced and reservoir 4 filled to a level above the top of casing 1. Shaft 13 may then be driven and sufficient resistance applied to the tail shaft 130 to cause a relative difference in the speed of rotation of the driving and driven shafts. Pump casing section 25 together with pump tilting box 56, valve 27, and tail shaft 130 rotate together. Due to the difference in speed of rotation of tilting box 56 and of the pump parts carried by shaft 13, pump pistons 40 will reciprocate building up fluid pressures and circulating fluid through ports 68 and 69 and the motor cylinders 101. Air entrained in the fluid will pass out of port 69 through opening 90 into casing section 25 and is replaced by fluid which, due to the rotation of casing 25 is thrown outward, while the air passes inward to the center of casing 25. Due to the action of the rotating groove section 16 and the head of fluid in reservoir 4, fluid is forced through sleeve 17 into the center of casing 25 and is then thrown outward by centrifugal action of the rotating parts. As a result air in casing 25 will be displaced by fluid and will be forced through central conduit 156 to outlet opening 157 formed in section 129 of the tail shaft 130 into stationary casing section 1. In casing section 1 the air rises upward passing forward through openings 100 in motor supporting extensions 93 and then through the opening 8 into the top of fluid reservoir 4 and to atmosphere. Fluid is supplied to reservoir 4 until substantially all of the air has been expelled from the internal system. The fluid level in the reservoir will then remain constant and is brought above the top of casing 1. The mechanism is filled with fluid and entrained air has been eliminated. Thereafter any entrained air which finds its way into the internal circulating system will pass outward through casing section 25, casing 1 and reservoir 4 so that in operation of the device, no emulsion of the fluid due to entraining and whipping of air will be formed.

In ordinary operation of the device, so long as the resistance to the tail shaft rotation is such that insufficient pressure is developed in the circulating system to cause endwise movement of shaft 130, the parts will remain in the position shown in Figure 1. The pump then acts as a simple clutch, the pump parts together with valve 27 and tail shaft 130 will rotate as a unit with driving shaft 13, and the mechanism will be in direct couple. In practice the parts are so proportioned that the pump and motor cylinder blocks will seat themselves on the valve due to the fluid pressures developed, and as the torque demands at the tail shaft approach the maximum value directly deliverable by the prime mover, shaft 130 will be shifted endwise, tilting the motor drive member 126 and the connected parts. As the motor parts tilt, the motor pistons reciprocate and the speed of rotation of shaft 130, valve plate 27, pump casing 25, and pump tilting box 56 falls behind the speed of rotation of the driving shaft 13 and connected parts causing pumping of fluid due to the difference in rotation of the driving and driven shaft. The motor then functions to apply driving force to the tail shaft 130 to meet the increased torque demands on the tail shaft, and the tilting will continue until a ratio of torque multiplication is established at which the prime mover can handle the tail shaft load.

When the torque demands at the tail shaft decrease, the fluid pressures will decrease due to the decreased resistance to motion and the motor backing plate 108 together with the motor drive member 126 will restore until a balance is again established at which the prime mover meets the torque demand at the tail shaft. When the load can be handled by the prime mover in direct couple with fluid pressures below the predetermined value at which the motor parts are tilted from normal position, the parts will be restored to the position shown in Figure 1 and the pump unit again functions as a simple clutch. In this way it will be seen that a torque multiplying and speed reducing transmission is provided in which the parts are clutched together so long as the resistance to motion on the tail shaft does not exceed a predetermined value. When the resistance to motion of the tail shaft goes above the predetermined value, part of the power is diverted through the torque multiplying and speed reducing mechanism, the torque ratio being automatically determined by the demands on the tail shaft.

When it is desired to meet special conditions, such for example, driving a motor vehicle in traffic, or for utilizing the engine compression on a motor vehicle for braking purposes, the torque ratio may be manually controlled by actuating arm 154 to tilt the motor parts to give the desired ratio. In this way the speed ratio of the driving and driven shaft is fixed independently of the fluid pressures and when the wheels of a vehicle are driving the tail shaft, as in going down a grade, the motor unit functions as a pump delivering fluid to the pump which in turn will operate as a motor turning the shaft 13 over against the compression of the engine.

In Figures 7 to 10 a modified form of the invention is shown in which a gear pump is substituted for the piston type pump shown in the form of invention heretofore described in which the stationary motor cylinders are unseated for declutching purposes, cooling means are provided in the motor unit, and a mechanical dogging connection is provided between the driving and driven shaft to mechanically couple the mechanism in direct drive. As many of the parts in this form of the invention are similar to parts and mechanisms utilized in the form of invention heretofore described, like reference characters will be applied to similar parts and only the altered constructions will be described. In this form of invention, the bearing 10 in which sleeve or flange 11 is supported is rigidly secured in the end cap 9 of fluid storage reservoir 4 so that endwise movement of shaft 13 is prevented. Collar 19 actuated by the shift lever 22 nests in a peripheral recess formed in a sleeve member 161 which is slidably splined to a suitably grooved section of the driving shaft 13. Formed integrally with the sleeve 161 are external dogging teeth 162 which are adapted to mesh with internal dogging teeth 163 formed in tubular extensions 164 of a rotary gear pump casing section 165 to secure a direct mechanical drive. Secured in the interior of extension 164 are the anti-friction bearings 166 in which the driving shaft section 13 is journaled for rotation. A spacing collar 167 is provided on the shaft section 13 between bearings 166 and a collar 168 threaded on the shaft 13 abuts against the forward bearing 166 holding the parts in assembled relation. Formed integrally in the rear end of shaft section 13 is pump element 169 that is journaled for rotation in a bore formed concentrically in casing section 165. Formed integrally with the pump element 169 are the internal teeth 170 forming a pump ring gear rotatably supported in the pump casing section 165 and concentric with shaft 13. Meshing with teeth 170 are teeth 171 of a pump pinion 172. Pump pinion 172 is supported on roller bearing 173 which in turn is supported on the offset or eccentric cylindrical projection 174 of pump member 175. Formed integrally with the element 175 is a sealing segment 176 disposed between the roofs of the teeth 170 and 171 opposite the position of engagement of the teeth as shown. Element 175 is rigidly secured to the pump casing and valve plate 177 by means of suitable securing screws or pins (not shown) and valve 177 is secured to the casing section 165 by means of securing bolts 178 so that the pump member 175 rotates as a unit with the elements 165, 176 and 177. Member 177 has formed on the end thereof the motor timing valve face 70 in which timing ports 68 and 69 are located. Motor timing face 70 and ports 68 and 69 are the same in construction as shown in Figure 2 and above described and merge into the pump inlet and outlet ports 179 and 180. The valve plate 177 is similar to valve plate 27 heretofore described, and similar auxiliary valve mechanisms are utilized therein. Communicating as shown in Figure 2 and hereinbefore described in detail are relief valves 77 which connect the ports to outlets 80 to the interior of casing 1' at a point outside of the motor timing face 70. Ports 68 and 69 in this form of the invention are connected to passages 82 in which valves 83 are seated as shown in Figure 2 and outlets 90 for valves 83 are provided in valve plate 177 to casing section 1' outside of the motor timing valve face 70. As above described, when port 68 is the high pressure port, the port 69 will be connected through opening 90 individual thereto to casing section 1' outside of the motor timing face 70 and the valve 83 controlling the port 68 will be closed. When port 69 becomes the high pressure port, the valve 83 individual to port 68 will be opened, establishing a communication between the low pressure side of the system through the corresponding ports 90 to the casing section 1'. Passage 67 interconnecting the ports 68 and 69 together with valve 72 and passage 136 to the interior bore 135 formed in the valve plate 177 are also provided to permit high pressure fluid to pass from port 68 or 69 to bore 135. Piston 134 in this form of invention is removably secured to a reduced end section of the tail or driven shaft 130 by means of a securing nut 181.

The motor unit in the present form of the invention is substantially the same as that described in connection with Figures 1 to 6 with the exception that cooling means therefor are added and provision is made for shifting the motor cylinders endwise to unseat the timing face of cylinder block 96 from the motor timing face 70. The cooling arrangement prevents excessive temperature rise of the mechanism which when transmitting large powers would tend to cause unequal expansion and warping of the valve faces. By the provision of my novel and improved cooling arrangement the heat generated may be dissipated without excessive temperature rise making feasible the transmission of considerably larger powers than heretofore available in hydraulic transmissions. It will be obvious to those skilled in the art that the methods of cooling hereinafter set forth may be applied to the motor unit in the form of invention heretofore described which may also be modified to unseat the cylinders rather than the pump cylinders to obtain a neutral by a utilization of the motor cylinder supporting and shifting means hereinafter set forth in an obvious manner.

Figures 8, 9, 10:
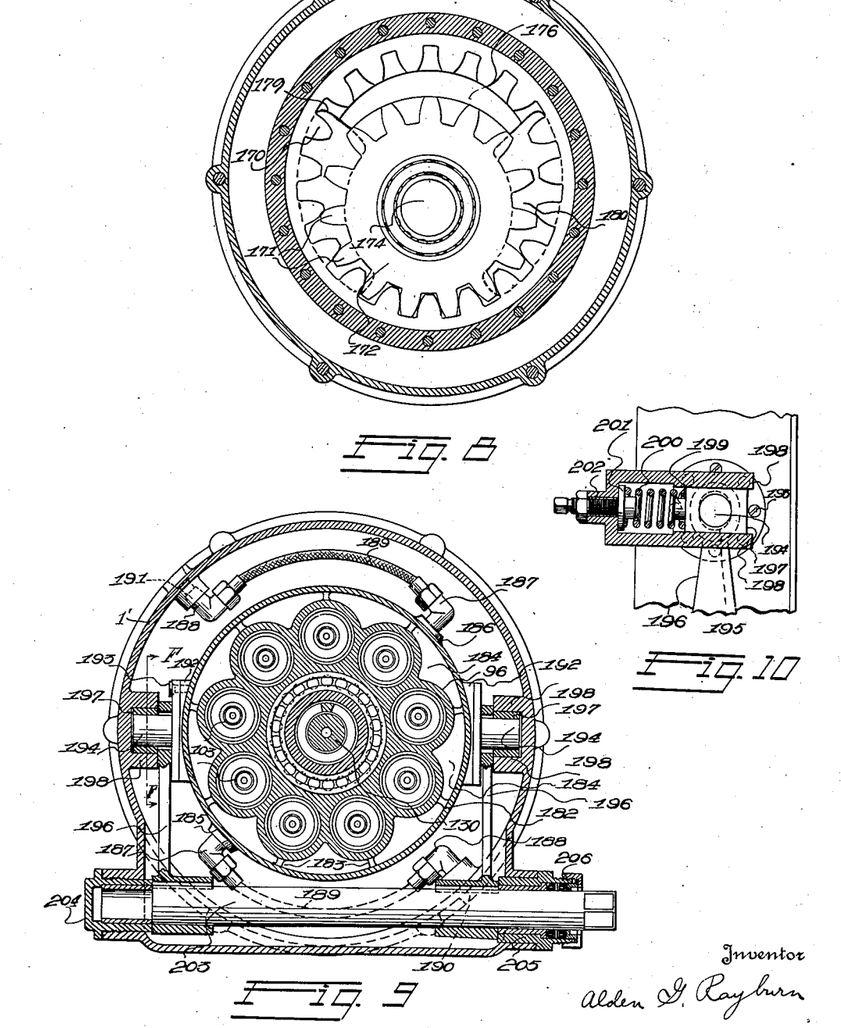
Figure 8 is a transverse sectional view taken substantially in plane D'—D' of Figure 7.
Figure 9 is a transverse sectional view taken in plane E—E of Figure 7.
Figure 10 is a fragmental sectional view taken in plane F—F of Figure 9.

In this form of invention the central self-aligning bearing 133 supporting the motor cylinder block is rigidly secured in the cylinder block 96 with its center of movement coinciding with the center of universal seating movement of block 96, and is slidable on the valve plate extension 132. Cylinder block 96 is recessed around the exterior of the cylinders as shown in Figure 9, and a cooling jacket 182 supported by the ribs 183 from the main body of cylinder block 96 forms cooling pockets or spaces 184 in communication with each other around the exterior of each cylinder and through which a cooling liquid such as water may be forced from the inlet opening 185 to the outlet opening 186 formed in the jacket 182. Inlet and outlet openings 185 and 186 are connected by the hose fittings 187 and 188 and the flexible hose couplings 189 to the water inlet and outlet connections 190 and 191 formed in the casing 1'. Cylinder block 96 provided with the cooling jacket and cooling connections just described may obviously be supported in casing 1' in the manner set forth in connection with Figures 1 to 6. When it is desired to unseat the motor cylinders from the motor timing face 70 for declutching purposes, suitable bosses 192 may be cast on the cooling jacket 182 and secured to these bosses by means of the countersunk screws 193 are the supporting trunnion members 194. The axis of trunnion members 194 passes through the center of aligning movement of bearing 133 and extends through elongated slots 195 (Figure 10) of the actuating arms 196 and the outer ends thereof are journaled for rotation in bearing blocks 197. Bearing blocks 197 are slidably supported between suitable guide ways 198 formed integrally with the casing 1', and are permitted a slight sidewise opening movement so that a limited seating universal movement of the cylinder block 96 is permitted. Formed integrally with bearing blocks 197 are cylindrical projections 199 forming seats for the ends of helical springs 200. The opposite ends of helical springs 200 are seated against the adjusting blocks 201 which in turn abut against adjusting screws 202 secured in suitable projections of the casing section 1'. Springs 200 are under compression normally urging bearing blocks 197 and motor cylinder block 96 to the left in Figure 7 to seat the cylinder block against valve face 70. Actuating arms 196 are keyed at their lower ends to crossshaft 203, one end of which is journaled for rotation in the bearing member 204 screwed into the casing 1' and the other end of which is journaled in and extends through bearing member 205 and packing gland 206. The outer end of shaft 203 is shaped to receive a suitable actuating lever. It will be seen that by rotating the shaft 203 clockwise in Figure 7 the motor cylinder block 96 is shifted so that the timing face thereof will be unseated from the motor timing face 70 and the high and low pressure ports 68 and 69 of the valve will communicate directly with the interior of the casing section 1 so that no driving pressures can be built up in the motor cylinders. The remaining mechanism of the motor is the same as set forth in connection with Figures 1 to 6 as will be seen, and a full understanding thereof will be had from a reference to the description hereinbefore given.

It will be apparent to those skilled in the art that various combinations have been disclosed, the details of which may be widely varied without departing from the spirit of my invention. It will furthermore be apparent that numerous mechanisms and subcombinations have been provided that are useful in other types of hydraulic transmissions, and in relations independently of power transmissions and such independent uses are contemplated as within the scope of the invention. Accordingly, having described preferred embodiments only of the invention, what is desired to be secured by Letters Patent and claimed as new is:

1. A hydraulic transmission comprising a stationary casing adapted to contain fluid; a driving and driven shaft rotatably supported in said stationary casing; a fluid pump comprising cylinders secured to said driving shaft by a universal connection; a plurality of pistons adapted to reciprocate in said pump cylinders; a motor comprising a plurality of non-rotatable cylinders supported for universal movement from said stationary casing section and actuating said driven shaft; fluid distributing means interposed between said pump and said motor cylinders; and means rotatable with said driven shaft for causing reciprocation of said pump pistons to pump fluid through said fluid distributing means to said motor cylinders.

2. A hydraulic transmission comprising a stationary casing; a driving shaft and a driven shaft journaled in said stationary casing; a pump casing and a fluid distributing valve comprising high and low pressure fluid ports rotatable with said driven shaft and housed within said stationary casing; pump actuating means secured to said pump casing; pump elements rotatable with said driving shaft for circulating fluid through said fluid distributing means; a fluid pass from said low pressure fluid port to the interior of said rotatable pump casing; and a drive motor for said driven shaft actuated by fluid delivered thereto by said valve, said motor being directly housed by said stationary casing.

3. In a hydraulic transmission, in combination, a plurality of parallel cylinders; reciprocating pistons mounted in said cylinders; a shaft with its axis of rotation parallel to said cylinders; means interposed between said pistons and said shaft for causing rotation of said shaft; means for supporting said shaft and cylinders and for supplying fluid under pressure to said cylinders; and means normally maintaining said shaft under tension during the rotation thereof.

4. The combination as set forth in claim 3 in which said last mentioned means comprises a pressure actuated piston secured to the end of said shaft.

5. In a hydraulic transmission, a stationary casing; a driving shaft and a driven shaft journaled in said stationary casing; a hydraulic motor driving said driven shaft; a fluid distributing valve and pump elements comprising a casing rotatable with said driven shaft; complementay pump elements rotatable with said driving shaft; and means for mechanically coupling said rotatable pump casing and said driving shaft.

6. A hydraulic transmission comprising a stationary casing; a driving and a driven shaft journaled in said casing; a pump comprising a casing, valve member and eccentric rotatable with said driven shaft; a pinion journaled on said eccentric; a ring gear meshing with said pinion and driven by said driving shaft; and a hydraulic motor actuated by fluid delivered thereto by said pump for driving said driven shaft.

7. The combination as set forth in claim 6 in which said motor comprises a plurality of non-rotatable cylinders in ported communication with said valve member, and means for shifting said cylinders away from said valve member to break said communication and thus to interrupt the driving connection between said driving and said driven shaft.

8. In combination a stationary casing; a hydraulic motor comprising non-rotatable cylinders directly supported from said stationary casing; a shaft driven by said motor and journaled in said casing; a driving shaft rotatably supported in said casing; a pump comprising parts mounted for rotation with said driving shaft and complemental parts rotated with said driven shaft; means for distributing fluid between said pump and said motor; means for automatically varying the volumetric capacity of said motor when the fluid pressures developed by said pump exceed a predetermined value; and means for varying the volumetric capacity of said motor independently of the pressures developed by said pump.

9. A fluid operated power transmission comprising a driving member; a driven member; a stationary casing supporting said members; a variable capacity fluid motor within said casing and in driving connection with said driven member; a fluid pump comprising an element reacting against and tending to rotate said driven member and a co-acting pump element driven by said driving member; means for distributing fluid between said pump and said motor; a stationary fluid reservoir; and means projecting through a portion of said reservoir longitudinally of the driven member for continuously forcing fluid from said reservoir into said casing during power transmitting operation.

10. A hydraulic transmission comprising a driving member; a driven member; a stationary casing; a variable capacity fluid motor driving said driven member comprising non-rotatable cylinders disposed within and supported universally from said casing; a fluid pump comprising an element reacting against and tending to rotate said driven member and a co-acting pump element driven by said driving member; means for distributing fluid between said pump and said motor; a stationary fluid reservoir communicating with atmosphere; and means for continuously removing operating liquid and gas from said casing to said reservoir to permit said gas to separate from said operating fluid and for forcing said operating liquid into said casing under pressure.

11. A hydraulic transmission comprising a stationary casing; driving and driven members supported in said casing; a rotatable valve member comprising a motor timing face disposed in said casing; a rotatable pump casing closed at one end by said valve member and containing pump elements forming a fluid pump actuated by the difference in rotation of said driving and driven members; a motor disposed in said stationary casing and driving said driven member; timing ports in said valve member extending to said timing face and connecting said pump and said motor, a fluid inlet passage to one of said ports, said passage opening into said rotatable casing at a point near the outer surface thereof, whereby fluid is positively fed by centrifugal action from said casing into said port as said casing rotates.

12. A hydraulic transmission comprising a driving member; a driven member; a stationary casing supporting said members; a rotatable valve member comprising pump and motor timing faces; a rotatable pump casing closed at one end by said valve member and containing elements forming a fluid pump actuated by the difference in rotation of said members; a motor disposed in said stationary casing actuating said driven member; timing ports in said valve member extending to said timing faces and connecting said pump and said motor; fluid inlet and outlet passages from said ports to the interior of said rotatable casing at points outside of said pump timing face; and control valves for said inlet and outlet passages seated by centrifugal force and fluid pressures and unseated by fluid pressures developed in the high pressure port of said valve member.

13. A torque multiplying transmission apparatus embodying a driving member; a driven member; a non-rotatable casing supporting said members; a variable capacity rotary fluid pump comprising complemental elements actuated by the difference in rotation of said members, one of said elements comprising an annular recessed member of the apparatus, another of said elements comprising reciprocating members fitting into said recessed member; a fluid motor comprising a non-rotatable recessed member and reciprocating means mounted therein driving said driven member; means for distributing the fluid between said pump and said motor; means responsive to fluid pressures developed by said pump to vary the capacity of said motor; and manually controlled means for varying the capacity of said motor.

14. A torque multiplying transmission apparatus embodying a driving member; a driven member; a stationary casing in which said members are supported; a fluid pump comprising an element actuated by said driving member and a complemental element operatively connected to said driven member, one of said elements being provided with a plurality of rotatable reciprocable members coacting with the other of said elements to pump fluid in operation of the apparatus; a fluid motor comprising reciprocating members driving said driven member; fluid passages between said pump and said motor; and means for shifting said driving member and said pump elements simultaneously to prevent the development of fluid pressures by said pump elements.

15. A torque multiplying hydraulic transmission comprising driving means; driven means; a hydraulic motor driving said driven means made up of complemental sets of parts one of which includes fluid distributing ports; a pump actuated by the relative rotation of said driving and said driven means comprising fluid inlet and outlet ports; rotary fluid distributing means between said pump and said motor and with respect to which said driven means is axially shiftable; and means responsive to fluid pressures actuating said driven means to hold the ported motor portion in operative driving position with relation to said fluid distributing means.

16. The combination as set forth in claim 15 in which said last mentioned means comprises a central piston rotating in unison with said distributing means and operative to exert varying axial tension on said driving means.

17. A torque multiplying hydraulic transmission comprising structure forming a support; driving means, and driven means carried by said support; a pump actuated by the relative rotation of said driving and said driven means comprising a recessed member adapted to receive fluid and from which fluid is expelled in operation; a motor comprising a plurality of reciprocable members reacting against said support and connected to said driven means to actuate the latter; means for distributing fluid between said pump and said motor; and a relatively small piston concentric with the axis of rotation of said driven means operative to resist separation of said motor from said distributing means in response to fluid pressures developed by said pump.

18. A torque multiplying transmission apparatus embodying a driving member; a driven member; a fluid pump comprising an element actuated by said driving member and a complemental element operatively connected to said driven member; one of said elements being provided with members coacting with the other of said elements to pump fluid in operation of the apparatus; a fluid motor comprising members driving said driven member; fluid distributing means between said pump and said motor, including ports extending in substantially straight paths from the pump to the motor; and fluid responsive means actuating said driven means to resist separation of said motor and said distributing means in power transmitting operations, said responsive means being disposed within the distributing means radially inwardly of said ports.

19. In a hydraulic transmission apparatus, a driving member; a driven member; a pump actuated by said driving member; a motor connected to said driven member for rotating the same; ported distributing means between said pump and said motor for conveying fluid therebetween, said distributing means comprising a rotatable member actuated by said driven member; pressure-responsive means formed by said driven member and said rotatable distributing means and designed to thrust said distributing means and said motor towards each other during operation of the apparatus.

20. In a hydraulic transmission apparatus, a driving member; a driven member; a pump actuated by said driving member; a motor connected to said driven member for rotating the same; ported distributing means between said pump and said motor for conveying fluid therebetween; pressure responsive means formed by said driven member and said distributing means and designed to thrust said distributing means and said motor towards each other during operation of the apparatus; a stationary casing for housing said motor; and said motor comprising complemental portions that are separable to vary the motor capacity in response to pressure thrusts developed by said pump, one of said portions being pivotally connected to said stationary casing to react thereagainst at a point offset from the line of separational thrust; whereby the capacity of said motor is automatically variable in response to fluid pressures developed in the apparatus.

21. In a hydraulic transmission apparatus, a driving member and a pump driven thereby; a driven member and a motor for driving the same; means for distributing fluid between said pump and said motor; and a stationary housing for the motor; said motor having a set of cylinders and pistons, an angle plate connected to said pistons, a backing plate in driving engagement with said driven member and against which said angle plate is designed to react, and a supporting element for said angle plate pivotally connected thereto at a pair of diametrically opposite points and pivotally connected to said stationary motor housing at a pair of points diametrically opposite each other and each arranged 90° from a corresponding one of said first mentioned points.

22. In the apparatus defined in claim 21, said backing plate being concentric with said driven member and pivotally connected to said stationary casing at a point eccentric to said driven member, and said last mentioned pair of points being shiftable longitudinally of said casing, whereby said angle plate may be tilted to vary the capacity of said motor in response to working pressures in said cylinders.

23. In a hydraulic transmission apparatus, a driving shaft; a pump driven thereby; a driven member; a motor for driving said driven member; a casing housing said pump; and an adjoining casing forming a fluid reservoir; said driving shaft projecting through said reservoir into said housing; and a spiral conveyor formed on said shaft for pumping fluid from said reservoir into said casing.

24. In a hydraulic transmission apparatus, a driving shaft; a pump driven thereby; a driven member; a motor for driving said driven member; a casing housing said pump; and an adjoining casing forming a fluid reservoir; said driving shaft projecting through said reservoir into said housing; a spiral conveyor carried on said shaft for pumping fluid from said reservoir into said casing; and said driven member having an extension forming a rotatable sleeve which cooperates with said spiral conveyor to automatically vary the flow of the latter in accordance with the relative speeds of the driving shaft and the driven member.

In testimony whereof I affix my signature.

ALDEN G. RAYBURN.